United States Patent
Nouda et al.

(10) Patent No.: US 8,391,234 B2
(45) Date of Patent: Mar. 5, 2013

(54) WIRELESS COMMUNICATION SYSTEM, MOBILE STATION, BASE STATION, AND WIRELESS COMMUNICATION METHOD

(75) Inventors: Yasunori Nouda, Tokyo (JP); Yoshitaka Hara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 349 days.

(21) Appl. No.: 12/863,987

(22) PCT Filed: Jan. 27, 2009

(86) PCT No.: PCT/JP2009/051262
§ 371 (c)(1),
(2), (4) Date: Jul. 22, 2010

(87) PCT Pub. No.: WO2009/096387
PCT Pub. Date: Aug. 6, 2009

(65) Prior Publication Data
US 2010/0296480 A1   Nov. 25, 2010

(30) Foreign Application Priority Data
Jan. 30, 2008   (JP) .................. 2008-019737

(51) Int. Cl.
 H04W 4/00   (2009.01)
 H04B 17/00  (2006.01)
 H04M 1/00   (2006.01)
(52) U.S. Cl. ................... 370/330; 370/389; 455/67.11; 455/452.1; 455/561
(58) Field of Classification Search .......... 370/310–468; 455/67.11, 67.13, 452.1, 509–561; 375/252, 375/329, 344
See application file for complete search history.

(56) References Cited

U.S. PATENT DOCUMENTS

| | | | |
|---|---|---|---|
| 7,903,628 B2 * | 3/2011 | Akkarakaran et al. | ........ 370/344 |
| 2007/0040703 A1 | 2/2007 | Akkarakaran et al. | |
| 2009/0257371 A1 | 10/2009 | Nishio | |

FOREIGN PATENT DOCUMENTS

| | | |
|---|---|---|
| WO | WO 2006/001658 A1 | 1/2006 |
| WO | 2007 024932 | 3/2007 |
| WO | 2007 129620 | 11/2007 |

OTHER PUBLICATIONS

"Necessity of Multiple Bandwidths for Sounding Reference Signals", NTT DoCoMo, Fujitsu, Mitsubishi Electric, NEC, Panasonic, Sharp, Toshiba Corporation, 3GPP TSG RAN WGI Meeting #51, R1-074807, pp. 1-10, (Nov. 9, 2007).

(Continued)

Primary Examiner — Afsar M. Qureshi
(74) Attorney, Agent, or Firm — Oblon, Spivak, McClelland, Maier & Neustadt, L.L.P.

(57) ABSTRACT

In a wireless communication system in which a base station, a mobile station, and a correspondent station are connected via a network, the base station includes a sounding-reference-signal arrangement control unit that causes sounding reference signals 5, 6, and 7, which are used for observing a propagation path state in the frequency band and are transmitted from the mobile station to the base station, to be transmitted for each of frequency bandwidths obtained by dividing the frequency band into a plurality of frequency bands in a minimum control time of the data transmission and in a time width shorter than the minimum control time, determines an arrangement of sounding reference signals 5, 6, and 7 in the minimum control time so that at least a part of transmission in the frequency bandwidth and transmission in another frequency bandwidth are executed at different times, and holds the arrangement as arrangement information. The mobile station includes a sounding-reference-signal transmission control unit that controls transmission of the sounding reference signals 5, 6, and 7 based on the arrangement information in the sounding-reference-signal arrangement control unit.

10 Claims, 6 Drawing Sheets

OTHER PUBLICATIONS

"3rd Generation Partnership Project; Technical Specification Group Radio Access Network; Evolved Universal Terrestrial Radio Access (E-UTRA); Physical channels and modulation (Release 8)", Technical Specification 3GPP TS 36.211 V8.0.0, pp. 10-11, 14-17, (2007).

"SRS Multiplexing Structure", Qualcomm Europe, 3GPP TSG RAN1 #51, R1-074949, pp. 1-10, (Nov. 5-9, 2007).

Garcia, M.J.F.G. et al., "Pilot patterns for channel estimation in OFDM", Electronics Letters, IEEE, vol. 36, No. 12, pp. 1049-1050, (Jun. 8, 2000).

Office Action issued Oct. 25, 2011 in Japanese Patent Application No. 2009-551521 (with partial English translation).

LG Electronics, "UL Sounding RS Operation", R1-080256, 3GPP TSG RAN WG1 #51 bis, Jan. 18, 2008, pp. 1-6.

LG Electronics, "UL Sounding RS Operation", R1-074727, 3GPP TSG RAN WG1 #51, Nov. 9, 2007, pp. 1-5.

LG Electronics, "Frequency Hopping Operation for UL Sounding RS", R1-074191, 3GPP TSG RAN WG1 #50 bis, Oct. 12, 2007, pp. 1-5.

LG Electronics, "UL Sounding RS Operation", R1-073474, 3GPP TSG RAN WG1 #50, Aug. 24, 2007, pp. 1-6.

NTT DoCoMo, Fujitsu, Mitsubishi Electric, Sharp, "Hopping and Planning of Sequence Groups for Uplink RS", R1-080241, 3GPP TSG RAN WG1 Meeting #51 bis, Jan. 18, 2008, pp. 1-4.

NTT DoCoMo, Mitsubishi Electric, Sharp, "Hopping and Planning of Sequence Groups for Uplink RS", R1-074804, 3GPP TSG RAN WG1 Meeting #51, Nov. 9, 2007, pp. 1-4.

NTT DoCoMo, "Hopping and Planning of Sequence Groups for Uplink RS", R1-074278, 3GPP TSG RAN WG1 Meeting #50 bis, Oct. 12, 2007, pp. 1-4.

Office Action issued Feb. 14, 2012, in Japanese Patent Application No. 2009-551521 (with partial English translation).

\* cited by examiner

FIG.6
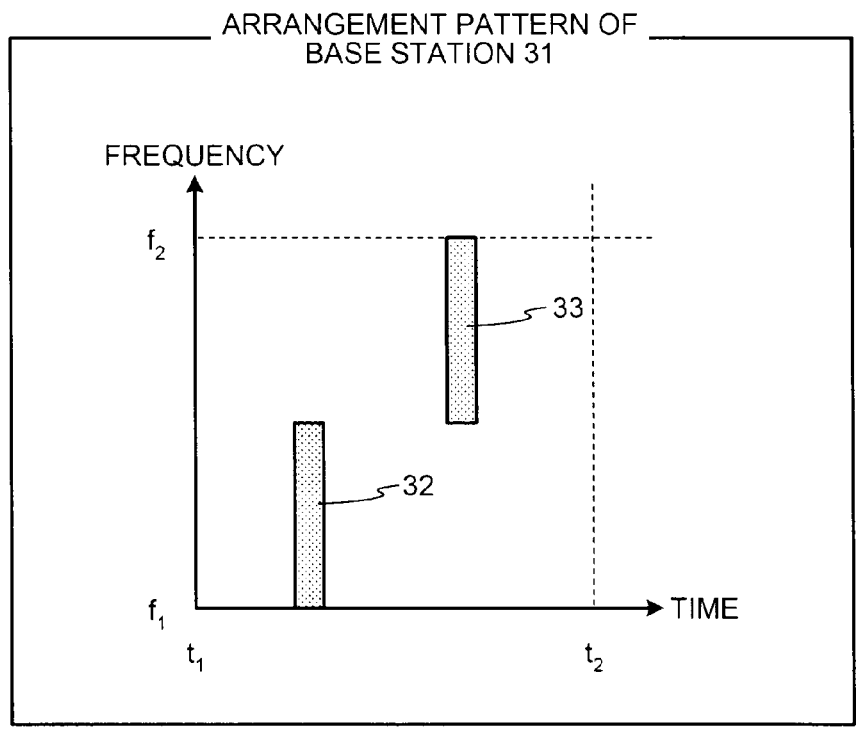
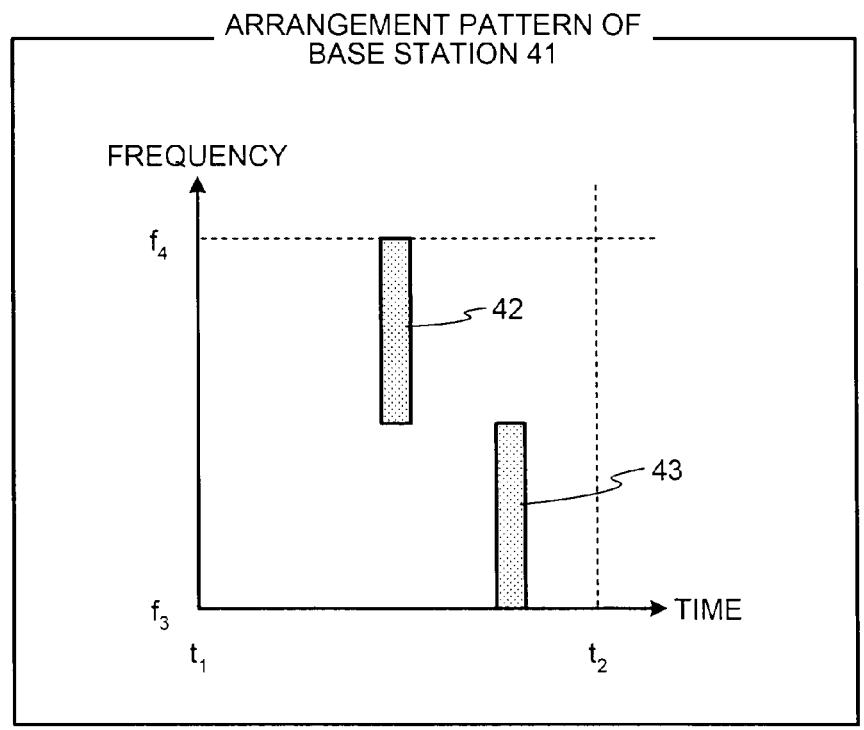

WIRELESS COMMUNICATION SYSTEM, MOBILE STATION, BASE STATION, AND WIRELESS COMMUNICATION METHOD

This application is a 371 of PCT/JP09/051262, filed on Jan. 27, 2009, and Applicant claims priority under Title 35, United States Code, §119 for Japanese application 2008-019737, filed on Jan. 30, 2008, the entire contents of both of which are incorporated herein by reference.

TECHNICAL FIELD

The present invention relates to a wireless communication system, a mobile station, a base station, and a wireless communication method having a function of detecting or setting a frequency appropriate for communications by using a reference signal.

BACKGROUND ART

At present, as a mobile wireless communication system as represented by a system for mobile phones, multiple access systems based on OFDMA (Orthogonal Frequency Division Multiple Access) which applies OFDM (Orthogonal Frequency Division Multiplexing) and SC-FDMA (Single Carrier Frequency Division Multiple Access) have been studied.

3GPP Specification TS36.211 V8.0.0 (2007-09) pp. 10-11, pp. 14-17, and 3GPP contribution TSG RAN1 #51 R1-074949 disclose techniques in which control is performed in a unit of time-frequency domain referred to as a resource block. The resource block is acquired by dividing the time into a plurality of time symbols and by dividing frequencies into a plurality of bands each of which is formed of a plurality of sub-carrier groups. Control is also performed in a unit of time domain referred to as a frame, which is formed by integrating a plurality of resource blocks in a time direction. By adopting these control methods, in which the control is performed in a unit of time-frequency domains or time domains, channel allocation and data transmission to a plurality of user terminals (mobile stations) can be performed efficiently.

A propagation path for a mobile wireless communication changes in time and frequency due to a spatial arrangement of antennas and obstacles, and a movement of a user terminal (a mobile station). Therefore, generally for data transmission, a reference signal, which is acquired by modulating a known sequence, needs to be transmitted and received between the user terminal (the mobile station) and a base station, to measure the propagation path for each band. The reference signal is used to obtain a transfer function of the propagation path of a channel that is used for data transmission, when data is demodulated.

Further, a reference signal is used when scheduling is performed to allocate channels to a plurality of user terminals (mobile stations), respectively. The reference signal is used for checking a state of a propagation path over a wide band of the respective user terminals (mobile stations) and for allocating a user in a good propagation path state in each frequency.

The latter reference signal is referred to as a sounding reference signal in 3GPP Specification TS36.211 V8.0.0, and 3GPP contribution TSG RAN1 #51 R1-074949, or the like, and is used in an uplink (mobile station for transmission and base station for reception). The sounding reference signal is a reference signal for selecting a frequency to be used for data transmission, and is different from the former reference signal for demodulating data in that it is transmitted and received in a wide band. In 3GPP Specification TS36.211 V8.0.0, a user terminal (a mobile station) transmits a sounding reference signal for all bands to a base station in a certain time symbol, to measure the propagation path state.

According to this method, when correlation of propagation paths between frequencies is high, the state of an uplink propagation path can be measured with respect to a plurality of user terminals (mobile stations) simultaneously. The user terminals use sounding reference signals of patterns orthogonal to each other. Improvement of frequency utilization efficiency can be performed by the scheduling technique mentioned above.

FIG. 7 shows an example of a time-frequency arrangement of the sounding reference signal in the conventional technique. A domain enclosed by a time width T and a frequency bandwidth F indicates a single resource block. In Nonpatent Literature 1, the time width of the resource block includes about ten symbols, and the frequency bandwidth of the resource block includes about ten or twenty sub-carriers. In the conventional technique, a sounding reference signal 4 is transmitted by using a single time symbol expressed by a shaded area over a bandwidth corresponding to resource blocks 1, 2, and 3. The number of the resource blocks in a frequency direction is three in FIG. 7; however, the value that can be taken in Nonpatent Literature 1 is from several to about a hundred, and also, such a case can be considered that a certain user terminal (a mobile station) transmits a sounding reference signal over a wide band. Also in this case, the user terminal (the mobile station) transmits a sounding reference signal in a determined time symbol in resource blocks.

DISCLOSURE OF INVENTION

Problem to be Solved by the Invention

According to the conventional techniques described above, there is a case that a transmission bandwidth of the sounding reference signal is wide, and a transmission power of a certain user terminal (a mobile station) is below a power required for measuring the state of the propagation path. In such a case, the user terminal (the mobile station) needs to narrow down the bandwidth for transmitting the sounding reference signal and use another time (a resource block after a time $t_0+T$ in FIG. 7, in which transmission of the sounding reference signal is permitted again) to transmit the sounding reference signal for the remaining bands in order to notify the base station of propagation information of the entire band.

That is, when a user terminal (a mobile station), which has a limited transmission power, cannot ensure a sufficient transmission power for performing channel estimation accurately over a wide band, and thus cannot transmit a wide-band sounding reference signal at once, the user terminal needs to use a plurality of resource blocks having time widths T to notify a base station of propagation path information of the entire band. Therefore, when there is a user terminal (a mobile station) having a low transmission capacity in a network, a time for transmitting propagation path information of the entire band to the base station increases, thereby deteriorating its communication efficiency.

The present invention has been made to solve the above problems, and an object of the present invention is to obtain a wireless communication system, a mobile station, a base station, and a wireless communication method that can improve communication efficiency, even when there is a user terminal (a mobile station) having a low transmission capacity in a network.

Means for Solving Problem

To solve the problems described above and achieve the object, a wireless communication system according to the present invention includes a base station, a mobile station connected to the base station via a network, and a correspondent station connected to the base station and the mobile station via the network, in which a certain range of frequency band is used for transmission and reception and a data communication frequency band to be used for data communication is set in the frequency band, wherein the base station comprises a sounding-reference-signal arrangement control unit that causes a sounding reference signal, which is used for observing a propagation path state in the frequency band and is transmitted from the mobile station to the base station, to be transmitted for each of frequency bandwidths obtained by dividing the frequency band into a plurality of frequency bands in a minimum control time of the data transmission and in a time width shorter than the minimum control time, determines an arrangement of the sounding reference signal in the minimum control time so that at least a part of transmission in the frequency bandwidth and transmission in another frequency bandwidth are executed at different times, and holds the arrangement as arrangement information, and the mobile station comprises a sounding-reference-signal transmission control unit that controls transmission of the sounding reference signal based on the arrangement information held in the sounding-reference-signal arrangement control unit.

Effect of the Invention

According to the present invention, the mobile station can transmit a sounding reference signal divided into a plurality of frequency bandwidths to a base station by further time-sharing the signal within a minimum control time of data transmission. Accordingly, the time for transmitting propagation path information of the entire band to the base station can be reduced, and thus communication efficiency can be improved.

BRIEF DESCRIPTION OF DRAWINGS

FIG. 6 is a diagram showing an example of an arrangement of a sounding reference signal corresponding to base stations.

EXPLANATIONS OF LETTERS OR NUMERALS

Figure 1:
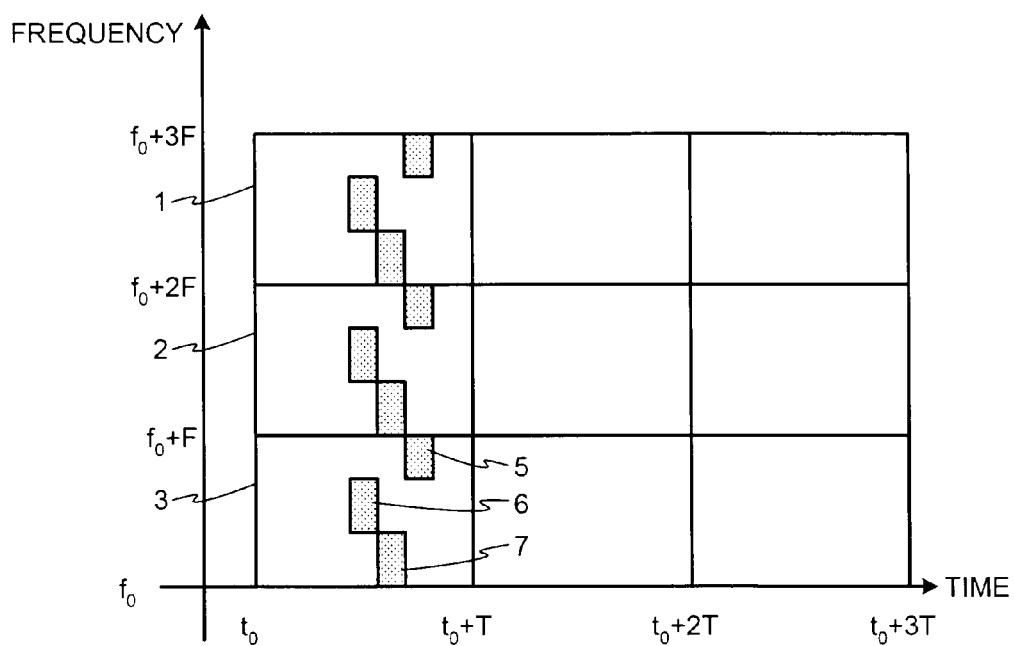
FIG. 1 is a diagram showing an example of a sounding reference signal arranged in each of resource blocks sectioned by a time width T and a frequency bandwidth F.

1, 2, 3 Resource block
4, 5, 6, 7, 8, 9, 34, 44 Sounding reference signal
10, 30, 40 Mobile station
11, 31, 41 Base station
12 Control information receiver
13 Arrangement pattern controller
14 Time-frequency arranging unit
15 Modulator
16 Demodulator
17 Sounding-reference-signal arrangement controller
18 Signal separating unit
19 Sounding-reference-signal detecting unit
20 Channel allocation controller
21 Control information transmitter
32, 33, 42, 43 Time-frequency
35, 45 Control information (time-frequency arrangement information)
36, 46 Transmission signal

BEST MODE(S) FOR CARRYING OUT THE INVENTION

Exemplary embodiments of a wireless communication system, a mobile station, a base station, and a wireless communication method according to the present invention will be explained below in detail with reference to the accompanying drawings. The present invention is not limited to the embodiments.

First Embodiment

A wireless communication system according to a first embodiment of the present invention includes at least one mobile station and at least one base station. First, it is explained how a sounding reference signal to be transmitted from a mobile station to a base station is arranged in resource blocks sectioned by a time width T and a frequency bandwidth F.

FIG. 1 shows an example of a sounding reference signal arranged in each of resource blocks sectioned by the time width T and the frequency bandwidth F. In this example, a modulation system such as OFDMA or SC-FDMA is assumed. Furthermore, it is assumed that a mobile station transmits a sounding reference signal in frequency bands from $f_0$ to $f_0+3F$, using resource blocks 1, 2, and 3 that correspond to a time $t_0$ to a time $t_0+T$.

In the present embodiment, the band of the sounding reference signal to be transmitted by the mobile station is divided into at least two bands according to an instruction from the base station, and is transmitted in different times in a minimum control time unit (the time width T) of data transmission. That is, in the present embodiment, a minimum control time unit for changing the frequency of the sounding reference signal is set smaller than the minimum control time unit (the time width T) of data transmission to perform finer control.

In FIG. 1, a band is divided into three in each of the resource blocks, and band-divided sounding reference signals are transmitted in different time symbols in the resource block, which is a minimum control unit of data transmission in the present embodiment (for example, in resource block 3, band-divided sounding reference signals 5, 6, and 7 are transmitted in respective time symbols different from each other).

In the present embodiment, more time symbols are required in the resource block than in a conventional system, because the sounding reference signal is distributed timewise and transmitted. However, this method solves the problem, i.e., a mobile station not capable of increasing its transmission power cannot transmit a sounding reference signal over the entire band from the time $t_0$ to the time $t_0+T$. Thus, the mobile station can quickly notify propagation information to the base station.

Further, because transmission power fluctuation in a time direction can be reduced, an effect of reducing a PAPR (Peak to Average Power Ratio) can be expected. That is, an inexpensive terminal having a small maximum transmission power or having a relatively large degradation in signal quality due to its PAPR can be used as the mobile station.

In this example, divided bands (for example, divided bands 5, 6, and 7 in the resource block 3) are allocated to separate time symbols, respectively. However, a part of the divided bands can be allocated to the same time symbol.

Figure 2:
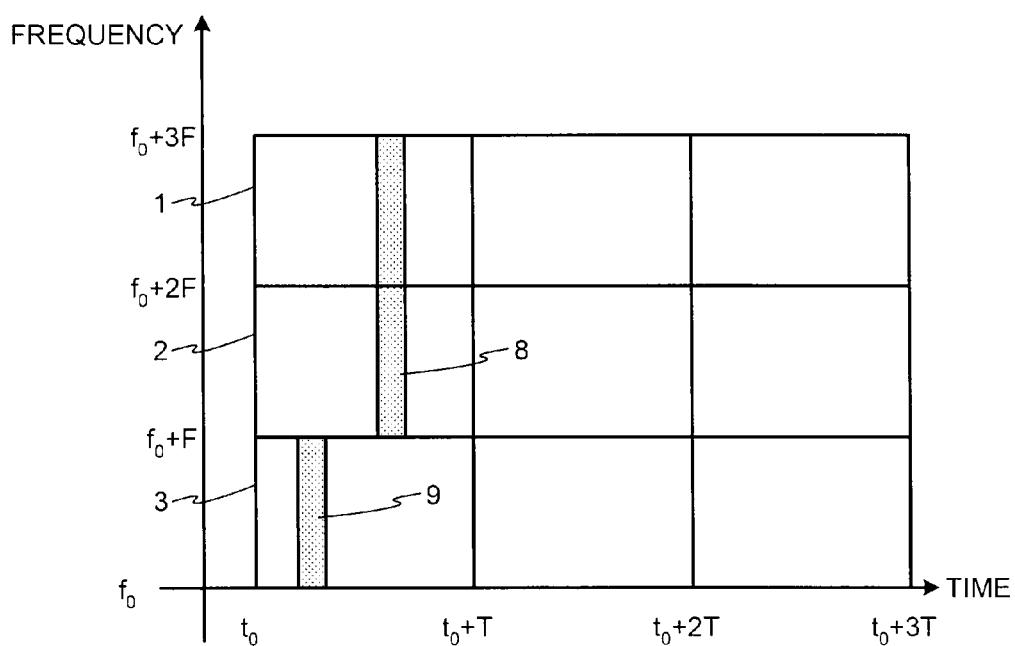
FIG. 2 is a diagram showing another example of a sounding reference signal arranged in each of resource blocks sectioned by the time width T and the frequency bandwidth F.

FIG. 2 shows another example of a sounding reference signal arranged in each of resource blocks sectioned by the time width T and the frequency bandwidth F. Also in this example, similarly to the example shown in FIG. 1, the modulation system such as OFDMA or SC-FDMA is assumed. Furthermore, it is assumed that the mobile station transmits a sounding reference signal in the frequency bands from $f_0$ to $f_0+3F$, using resource blocks 1, 2, and 3 that correspond to the time $t_0$ to the time $t_0+T$.

In this example, the band is not divided in each of the resource blocks. The sounding reference signals are asynchronously arranged in mutually different time symbols in each of the resource blocks (frequency bands), which is a minimum control unit of data transmission in the present embodiment (for example, a sounding reference signal 8 is transmitted in the resource blocks 1 and 2, and a sounding reference signal 9 is transmitted in the resource block 3, in the time symbols different from each other). The same effect as that of FIG. 1 can be also achieved by this method.

While it is desired to control the band division explained with reference to FIGS. 1 and 2 on the base station side, the band division can be controlled on a network in a distributed manner by transferring appropriate control information between wireless stations communicating with each other (between a plurality of mobile stations and a plurality of base stations).

Figure 3:
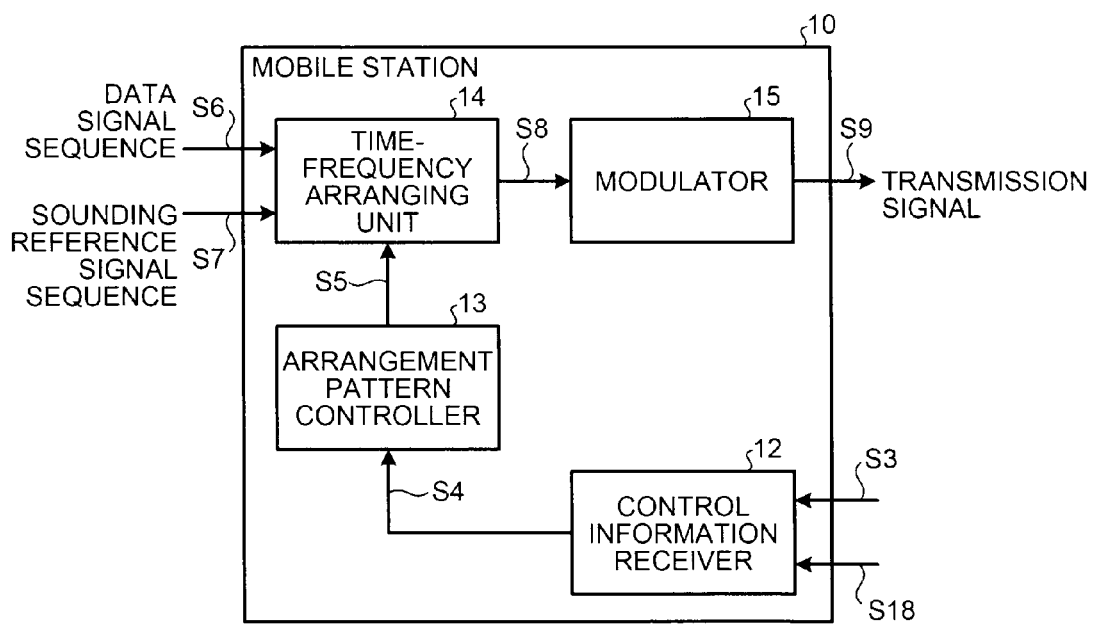
FIG. 3 is a block diagram showing a configuration of a mobile station.
Figure 4:
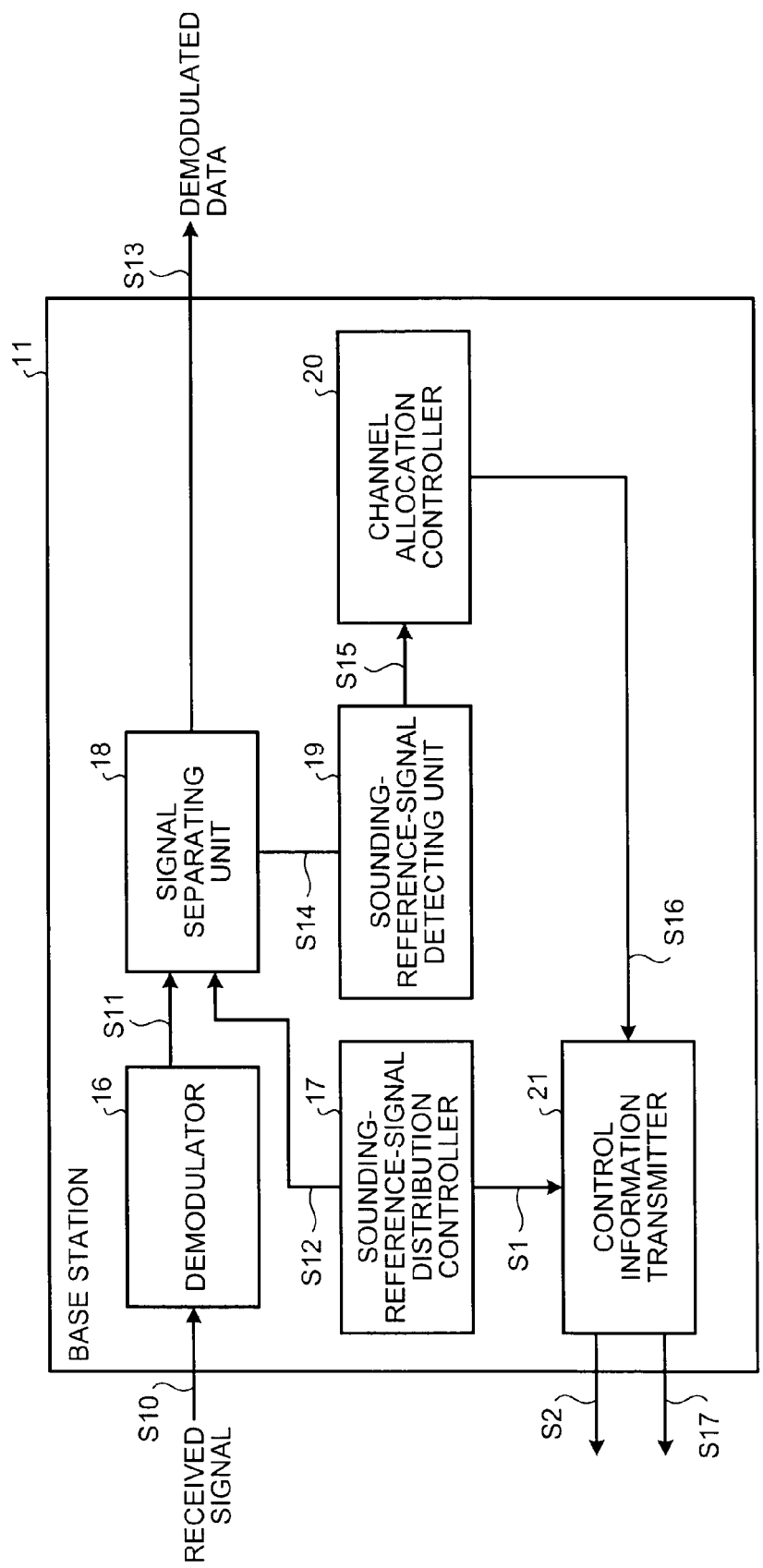
FIG. 4 is a block diagram showing a configuration of a base station.

A configuration of the wireless communication system according to the first embodiment of the present invention is explained next. As mentioned above, the wireless communication system includes at least one mobile station and at least one base station. FIG. 3 is a block diagram showing a configuration of the mobile station, and FIG. 4 is a block diagram showing a configuration of the base station.

A mobile station 10 transmits a sounding reference signal and a base station 11 receives the sounding reference signal. The mobile station 10 includes a control information receiver 12, an arrangement pattern controller 13, a time-frequency arranging unit 14, and a modulator 15. The base station 11 includes a demodulator 16, a sounding-reference-signal arrangement controller 17, a signal separating unit 18, a sounding-reference-signal detecting unit 19, a channel allocation controller 20, and a control information transmitter 21.

The control information receiver 12 receives control information (time-frequency arrangement information and allocation information) transmitted from the base station 11. The time-frequency arrangement information represents how to arrange the sounding reference signal on time and frequencies (in respective resource blocks sectioned by a time width and a frequency bandwidth). The allocation information is information of a channel allocated to the mobile station 10 according to scheduling by the base station 11.

The arrangement pattern controller 13 stores the control information (the time-frequency arrangement information and the allocation information) received by the control information receiver 12, and controls the time-frequency arranging unit 14 based on the control information (the time-frequency arrangement information and the allocation information). The time-frequency arranging unit 14 arranges data signals and sounding reference signals on time and frequencies (allocates these signals to predetermined positions in the respective resource blocks). The modulator 15 modulates the data signals and the sounding reference signals arranged on the time and frequencies, and transmits these signals to the base station 11 as transmission signals.

The demodulator 16 demodulates the received signals from the mobile station 10. The sounding-reference-signal arrangement controller 17 determines (generates) and holds the time-frequency arrangement information. The signal separating unit 18 separates the data signals and the sounding reference signals in the demodulated received signal based on the time-frequency arrangement information held by the sounding-reference-signal arrangement controller 17. The sounding-reference-signal detecting unit 19 measures reception quality of a sounding reference signal separated by the signal separating unit 18.

The channel allocation controller 20 receives a measurement result of the reception quality of the sounding reference signal measured by the sounding-reference-signal detecting unit 19, and performs scheduling for allocating a channel to the respective mobile stations 10. The control information transmitter 21 transmits the time-frequency arrangement information held by the sounding-reference-signal arrangement controller 17 and the allocation information scheduled by the channel allocation controller 20 to the mobile station 10 as a control signal.

A wireless communication method according to the first embodiment of the present invention is explained next. In the base station 11, the sounding-reference-signal arrangement controller 17 transmits time-frequency arrangement information held therein to the control information transmitter 21 (S1). The control information transmitter 21 transmits the time-frequency arrangement information to the mobile station 10 as a control signal (S2).

In the mobile station 10, the control information receiver 12 receives the time-frequency arrangement information (S3). The arrangement pattern controller 13 stores the received time-frequency arrangement information (S4). The information arrangement pattern controller 13 transmits an arrangement control signal based on the stored control information (time-frequency arrangement information) to the time-frequency arranging unit 14 (S5). The time-frequency arranging unit 14 receives a data signal from another part of the mobile station 10 (not shown) (S6), and receives a sounding reference signal (S7). The time-frequency arranging unit 14 maps the data signal and the sounding reference signal on time and frequencies based on the received arrangement control signal. The modulator 15 receives the data signal and the sounding reference signal mapped on time and frequencies (S8), then modulates and transmits the signal to the base station 11 as a transmission signal (S9).

Again, in the base station 11, upon reception of the transmission signal (the received signal) from the mobile station 10 (S10), the demodulator 16 demodulates the signal. The signal separating unit 18 receives the demodulated data signal and sounding reference signal mapped on the time and frequencies (S11), and receives the time-frequency arrangement information held by the sounding-reference-signal arrangement controller 17 (S12). Furthermore, The signal separating unit 18 separates the data signal and the sounding reference signal based on the time-frequency arrangement information.

The separated data signal is transmitted to another part of the base station 11 (not shown) (S13), and the separated sounding reference signal is transmitted to the sounding-reference-signal detecting unit 19 (S14). The sounding-reference-signal detecting unit 19 measures the reception quality of the received sounding reference signal. The channel allocation controller 20 receives a measurement result of the reception quality of the sounding reference signal (S15), performs scheduling for allocating a channel to the respective mobile stations 10, and transmits the allocation information to the control information transmitter 21 (S16). The control information transmitter 21 transmits the allocation information to the mobile station 10 as a control signal (S17).

Again, in the mobile station 10, the control information receiver 12 receives the allocation information (S18). The information arrangement pattern controller 13 stores the received allocation information (S4), and transmits an arrangement control signal based on the stored control information (the time-frequency arrangement information and the allocation information) to the time-frequency arranging unit 14 (S5). Accordingly, in the time-frequency arranging unit 14, mapping of the data signal on time and frequencies is mainly adjusted based on the arrangement control signal received this time. Thereafter, the same processes are repeated between the mobile station 10 and the base station 11.

The transmission signal can be mapped by the time-frequency arranging unit 14 and the received signal can be separated by the signal separating unit 18 according to a conventional method, by using OFDM or SC-FDMA as the modulation method.

A separation method of a sounding reference signal on a time and frequencies (respective resource blocks sectioned by a time width and a frequency bandwidth) is explained next. The base station 11 controls an arrangement pattern on time and frequencies of a sounding reference signal according to a transmission power of the mobile station 10, which is a correspondent node, a bandwidth of the entire sounding reference signal, and a distance from the mobile station 10.

As an example, the sounding reference signal is distributed to many time symbols and transmitted for a while after communication has been started between the mobile station 10 and the base station 11. Thus, propagation path information can be reliably notified. After a certain time has passed, the base station 11 can estimate the transmission power per frequency required for notifying the propagation path information based on communication records until then. The base station 11 adaptively controls a time-frequency arrangement according to the estimated transmission power, and notifies the time-frequency arrangement to the mobile station 10. At this time, the base station 11 can simultaneously control the transmission power per frequency of the sounding reference signal, thereby enabling to save power consumption of the mobile station 10.

To perform adaptive control immediately after communication has been started between the mobile station 10 and the base station 11, for example, the mobile station 10 transmits a certain signal with information of its transmission power to the base station 11 immediately after starting communications. In the base station 11, the transmission power per frequency required for notifying the propagation path information is estimated based on the received power of the certain signal, thereby enabling to realize the adaptive control.

A method for avoiding a decrease in data transmission efficiency and a method for reducing control information, while dividing a sounding reference signal on time and frequencies (respective resource blocks sectioned by a time width and a frequency bandwidth) are explained next.

The base station 11 determines a time-frequency arrangement pattern (information) of a sounding reference signal. At this time, there is a frequency band in which the sounding reference signal is not transmitted in respective time symbols because the sounding reference signal is transmitted in a plurality of time symbols (in an example in FIG. 2, the frequency band from $f_0$ to $f_0+F$ of time in which the sounding reference signal 8 is present, and the frequency band from $f_0+F$ to $f_0+3F$ of time in which the sounding reference signal 9 is present). By allocating these parts as a channel for data transmission to other mobile stations 10 that do not transmit the sounding reference signal within the time, a decrease in uplink data transmission efficiency as the entire system can be suppressed.

Further, at the time of determining the time-frequency arrangement pattern, a plurality of arrangement patterns of the sounding reference signal is determined in advance. Then, a symbol for specifying a pattern, and an arrangement pattern information corresponding to the symbol are stored in a memory, by the mobile station 10 and the base station 11, respectively. In this way, control information for transferring patterns between the mobile station 10 that transmits the sounding reference signal and the base station 11 can be reduced. By using this method, the amount of control information for notifying channel allocation for data transmission can be simultaneously reduced in the present embodiment.

According to the wireless communication system of the first embodiment, a mobile station can further divide a sounding reference signal, which is divided into a plurality of frequency bandwidths, and transmit the sounding reference signal to a base station by time-sharing within a minimum control time of data transmission. With this, a time required for transmitting propagation path information of the entire band to the base station can be reduced, and the communication efficiency can be improved.

Second Embodiment

Figure 5:
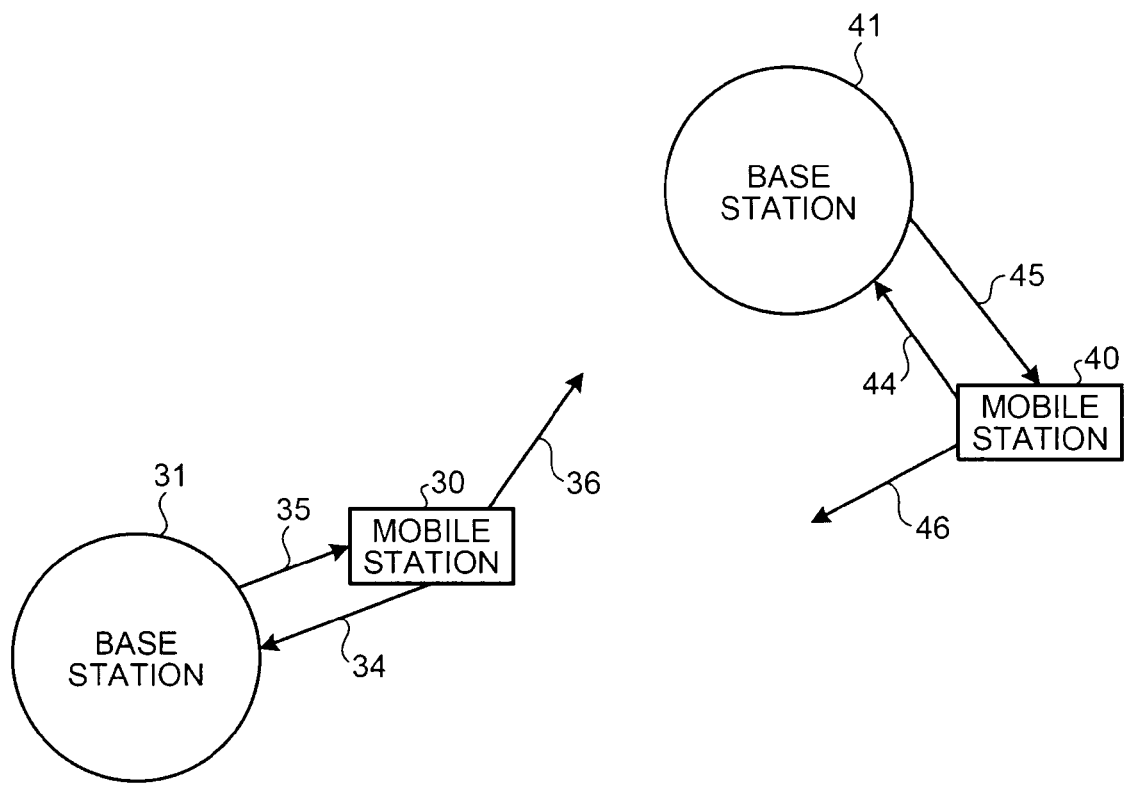
FIG. 5 is a diagram showing an example of a network of a wireless communication system according to a second embodiment of the present invention.
Figure 7:
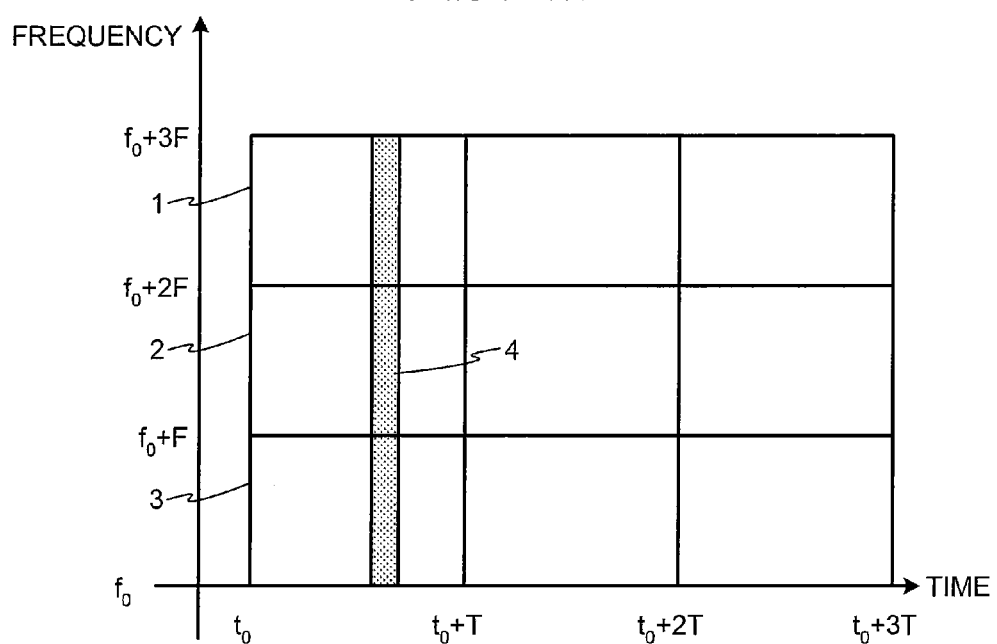
FIG. 7 is a diagram showing an example of a time-frequency arrangement of a sounding reference signal in a conventional technique.

A wireless communication system according to a second embodiment of the present invention includes a plurality of mobile stations and a plurality of base stations. FIG. 5 shows an example of a network of the wireless communication system according to the second embodiment of the present invention. In this wireless communication system, a network is established in a state in which a plurality of base stations that use the same frequency band are arranged close to each other. In FIG. 5, a mobile station 30 establishes communications with a base station 31, and a mobile station 40 establishes communications with a base station 41. The mobile stations 30 and 40 have the same configuration and function as those of the mobile station 10 according to the first embodiment of the present invention, and the base stations 31 and 41 have the same configuration and function as those of the base station 11 according to the first embodiment of the present invention.

In this example, the base station 31 determines an arrangement of an upstream sounding reference signal, and notifies the arrangement to the mobile station 30, which is a correspondent node. The base station 41 determines an arrangement of an uplink sounding reference signal, and notifies the arrangement to the mobile station 40, which is a correspondent node. FIG. 6 is an example of an arrangement of the sounding reference signal corresponding to the base stations 31 and 41. In FIG. 6, a frequency band for the base station 31 is from frequency $f_1$ to $f_2$, and a frequency band for the base station 41 is from frequency $f_3$ to $f_4$. A time width from $t_1$ to $t_2$ corresponds to, for example, a single resource block.

The base station 31 notifies control information (time-frequency arrangement information) 35 to the mobile station 30 so as to send a sounding reference signal 34 by using time-frequencies 32 and 33. The base station 41 notifies control information (time-frequency arrangement information) 45 to the mobile station 40 so as to send a sounding reference signal 44 by using time frequencies 42 and 43.

The mobile station 30 arranges the sounding reference signal 34 and transmits the signal to the base station 31 according to the control information (time-frequency arrangement information) 35 received from the base station 31 that communicates with the mobile station 30. The mobile station 40 arranges the sounding reference signal 44 and transmits the signal to the base station 41 according to the received control information (time-frequency arrangement information) 45 from the base station 41 that communicates with the mobile station 40.

When the base stations 31 and 41 use the same frequency band for the uplink (for example, a case of $f_1=f_3$ and $f_2=f_4$ in FIG. 6), the base station 31 receives a transmission signal 46 from the mobile station 40 as an interference. Also, the base station 41 receives a transmission signal 36 from the mobile station 30 as an interference. At this time, by adjusting such that the arrangement of the sounding reference signals 34 and 44 in the resource blocks is different from each other at least partially (for example, time frequencies 42 and 43 with respect to time frequencies 32 and 33), the power of interference signal can be measured.

As an adjusting method, there is a method of incidentally generating a frame in which arrangements of the sounding reference signal is different between the base stations 31 and 41, by asynchronously changing the arrangement of the sounding reference signal for each time frame between the base stations 31 and 41. In addition, the arrangement of the sounding reference signal is determined in advance. Further, as an example of a measuring method of an interference power, there is a method of subtracting an estimated received power of a sounding reference signal from a total received power.

Further, a power measuring method of an interference signal due to a sounding reference signal described above can be performed only by differently arranging the sounding reference signals between the base stations 31 and 41. Therefore, this method can be applied separately from a method of distributing the sounding reference signal timewise.

The interference signal power estimated according to the methods described above can be used for signal processing and a control method taking the interference into consideration, thereby improving the communication quality.

As described above, according to the wireless communication system of the second embodiment, a base station can adjust an arrangement in a resource block of a sounding reference signal to be transmitted from a mobile station such that it is different from the arrangement in a resource block of a sounding reference signal to be transmitted from another mobile station to another base station. Therefore, the interference signal power from other mobile stations can be measured.

Further, according to the wireless communication system of the second embodiment, because the base station can asynchronously change the arrangement in the resource block of the sounding reference signal to be transmitted from the mobile station for each time frame, the interference signal power from other mobile stations can be measured.

INDUSTRIAL APPLICABILITY

As described above, the mobile station, the base station, the wireless communication system, and the wireless communication method according to the present invention are useful for a communication system, such as a mobile communication system, in which a terminal and a base station perform wireless communications. Particularly, these are useful for a wireless communication system, a mobile station, a base station, and a wireless communication method having a function of detecting or setting a frequency appropriate for communications by using a reference signal.

The invention claimed is:

1. A wireless communication system comprising a base station, a mobile station connected to the base station via a network, and a correspondent station connected to the base station and the mobile station via the network, in which a certain range of frequency band is used for transmission and reception and a data communication frequency band to be used for data communication is set in the frequency band, wherein
the base station comprises a sounding-reference-signal arrangement control unit that causes a sounding reference signal, which is used for observing a propagation path state in the frequency band and is transmitted from the mobile station to the base station, to be transmitted for each of frequency bandwidths obtained by dividing the frequency band into a plurality of frequency bands in a minimum control time of the data transmission and in a time width shorter than the minimum control time, determines an arrangement of the sounding reference signal in the minimum control time so that at least a part of transmission in the frequency bandwidth and transmission in another frequency bandwidth are executed at different times, and holds the arrangement as arrangement information, and
the mobile station comprises a sounding-reference-signal transmission control unit that controls transmission of the sounding reference signal based on the arrangement information held in the sounding-reference-signal arrangement control unit.

2. The wireless communication system according to claim 1, wherein
the base station determines an arrangement of the sounding reference signal in the minimum control time to be different from arrangements in other base stations.

3. The wireless communication system according to claim 2, wherein
the base station determines an arrangement of the sounding reference signal in the minimum control time for each of the minimum control time.

4. A mobile station that uses a certain range of frequency band for transmission and reception, sets a data communication frequency band used for data communication in the frequency band, and is connected to a base station wirelessly, wherein
the mobile station comprises a sounding-reference-signal transmission control unit that controls a sounding reference signal, which is used for observing a propagation path state in the frequency band and is transmitted from the mobile station to the base station, to be transmitted for each of frequency bandwidths obtained by dividing the frequency band into a plurality of frequency bands in a minimum control time of the data transmission and in a time width shorter than the minimum control time, and controls such that at least a part of transmission in the frequency bandwidth and transmission in another frequency bandwidth are executed at different times.

5. A base station that uses a certain range of frequency band for transmission and reception, sets a data communication frequency band used for data communication in the frequency band, and is connected to a mobile station wirelessly, wherein
the base station comprises a sounding-reference-signal arrangement control unit that causes a sounding reference signal, which is used for observing a propagation path state in the frequency band and is transmitted from the mobile station to the base station, to be transmitted for each of frequency bandwidths obtained by dividing the frequency band into a plurality of frequency bands in a minimum control time of the data transmission and in a time width shorter than the minimum control time, determines an arrangement of the sounding reference signal in the minimum control time so that at least a part of transmission in the frequency bandwidth and transmission in another frequency bandwidth are executed at different times, and holds the arrangement as arrangement information.

6. The base station according to claim 5, wherein
the base station determines an arrangement of the sounding reference signal in the minimum control time to be different from arrangements in other base stations.

7. The base station according to claim 6, wherein
the base station determines an arrangement of the sounding reference signal in the minimum control time for each of the minimum control time.

8. A wireless communication method in a wireless communication system comprising a base station, a mobile station connected to the base station via a network, and a correspondent station connected to the base station and the mobile station via the network, in which a certain range of frequency band is used for transmission and reception and a data communication frequency band to be used for data communication is set in the frequency band, wherein the wireless communication method comprises:
a determination step at which the base station causes a sounding reference signal, which is used for observing a propagation path state in the frequency band and is transmitted from the mobile station to the base station, to be transmitted for each of frequency bandwidths obtained by dividing the frequency band into a plurality of frequency bands in a minimum control time of the data transmission and in a time width shorter than the minimum control time, determines an arrangement of the sounding reference signal in the minimum control time so that at least a part of transmission in the frequency bandwidth and transmission in another frequency bandwidth are executed at different times;
a holding step at which the base station holds the determined arrangement as arrangement information; and
a transmission step at which the mobile station transmits the sounding reference signal based on the arrangement information held at the holding step.

9. The wireless communication method according to claim 8, wherein
in the determination step, an arrangement of the sounding reference signal in the minimum control time is determined to be different from arrangements in other base stations.

10. The wireless communication method according to claim 9, wherein
in the determination step, an arrangement of the sounding reference signal in the minimum control time is determined for each of the minimum control time.

* * * * *